Patented Feb. 20, 1934

1,948,465

UNITED STATES PATENT OFFICE 1,948,465

SYNTHETIC RESIN AND METHOD FOR ITS PRODUCTION

Madhav R. Bhagwat, Brooklyn, N. Y., assignor to Combustion Utilities Corporation, New York, N. Y., a corporation of Maine No Drawing. Application April 8, 1929
Serial No. 353,675

23 Claims. (Cl. 260—4)

This invention relates to methods for the production of synthetic resins of the phenol formaldehyde type, and more especially it concerns the production of soluble fusible phenol formaldehyde resins capable of being converted by heat or the like into the insoluble, infusible form by a process in which the resins are precipitated from an aqueous phenolate solution prepared by a suitable direct treatment of a coal tar or other tar acid-containing distillate, with a solution of an alkaline compound. The invention is of particular utility in connection with the preparation of resinous condensation products from low temperature or primary tars such as those obtained by the ordinary low temperature carbonization of bituminous material such as coal.

It is well known that phenolic materials such as phenol and the cresols are capable of reacting with formaldehyde or other compounds containing a reactive methylene radical to form either permanently soluble, fusible condensation products, or to form those of the potentially insoluble infusible type depending upon the conditions under which the condensation is performed. The resins of the second named class are exemplified by the bakelite "A" and "B" types which are generally considered to be intermediate or partial reaction products of the reaction of phenolic compounds with formaldehyde or the like. These resins are plastic when hot, soluble in methyl and ethyl alcohol, acetone and similar solvents, and are completely insoluble in benzene. Such resins have been found to be of value in varnishes, molding compounds, lacquers and the like. The final reaction products of the condensation of phenol and formaldehyde or the like are insoluble, infusible bodies and are prepared by subjecting the resins of the second mentioned group to heat, or to heat and pressure.

Heretofore there has been a limited number of phenolic bodies that have been found satisfactory for the production of desirable condensation products of the second type referred to above. Among the most commonly used materials of this kind heretofore have been relatively pure phenol and various cresols. Certain of the latter such as orthocresol have proved unsatisfactory for this purpose as they yield partial condensation products not readily hardenable by heat. The higher phenols such as xylenols also yield poor grades of synthetic resins; and "In the field of higher homologues of phenols the proportion of inert or non-resin forming or crystalline bodies increases". (Carleton Ellis, "Synthetic Resins and their Plastics" (1923) p. 95.) For reasons such as the above the commercial forms of these resins as now obtainable upon the market, are usually prepared from pure phenol, and from meta and para cresols that have been specially refined by distillation or the like. However, the hardness, brittleness and lack of toughness and elasticity of the crude resins themselves has limited the scope of the commercial application thereof, and has necessitated the use of various softening agents for suitably modifying the properties of these resins. Since the purification of these phenolic substances is attended with considerable expense, the cost of production of these synthetic resins from pure phenols is rather high. Furthermore the condensation reaction, where the free phenols and the like have been employed, has been difficult to control so as to stop the reaction at the desired intermediate stage.

In order to develop new and cheaper sources of raw material suitable for the production of these synthetic resins of the potentially insoluble, infusible type, processes have been developed heretofore for the utilization of coal tar and of distillates thereof in which processes coal tar distillates have been directly treated with substances containing a reactive methylene radical in the presence of suitable catalysts whereby resinous condensation products have been directly precipitated in the presence of an excess of the neutral tar oil, nitrogenous bases and ammonium compounds normally present in the said distillates. While it is possible under properly controlled conditions to secure a satisfactory resinous product in this way, it has been necessary in practice to pre-treat the said distillate for the purpose of removing certain water-soluble compounds present therein such as ammonium salts which act to prevent the precipitation of the resinous condensation product in the presence of the neutrol oil and the like or of neutralizing the effects produced by these compounds. This pretreated distillate upon being treated with an equimolecular amount of formaldehyde and a small amount of an alkaline catalyst, yields a resin of the bakelite A or B type which precipitates from the mixture and after being removed therefrom may be washed with water or other suitable liquid and dried. The drying of the precipitated wet resin of the phenol formaldehyde type such as that referred to here presents many difficulties, due in part to the fact that the crude resinous product occludes appreciable amounts of neutral oil during the condensation step, and apparently an oil film covers the resin particles and hinders the drying of the latter. In the past it has been necessary to resort to vacuum distillation of the wet resin at a comparatively low temperature in order to suitably dry it while at the same time preventing the resin from being converted into the insoluble form, in which form it is no longer soluble in the usual solvents nor ordinarily reconvertible to the soluble form. Such a low temperature distillation requires a long period of time since the water and neutral oil are slow in coming off. When the resinous condensation product is directly precipitated from a coal tar distillate, the neutral oil portion of the distillate which is not acted upon by the formaldehyde forms an upper liquid layer. This neutral oil layer, after it is subsequently separated from the precipitated resin, usually contains a substantial amount of the said resins, and unreacted tar acids or formaldehyde, so that the unavoidable material losses in the process as heretofore carried out have been fairly great.

The present invention is based upon the discovery that high grade resins containing relatively small amounts of impurities can be prepared from tar oils or other tar acid-containing distillates such as those obtained in the high temperature or low temperature distillation of bituminous coal, by the treatment thereof with dilute aqueous solutions of alkalis and alkaline compounds and the subsequent treatment of the resultant aqueous solution of the salts of the tar acids with formaldehyde under suitable conditions to produce the desired condensation reaction. Under such conditions the speed of the condensation reaction is sufficiently slow to permit a full control of the same. The diluting effect of the water and the solvent action of the alkali or alkaline compound renders possible the removal from the heterogeneous mixtures of which the tar distillates are composed of certain impurities such as hydrocarbons, nitrogen bases and the like which would ordinarily interfere with the condensation reaction.

Among the more important objects of the present invention are to provide in an improved manner for producing soluble, fusible resinous condensation products of the phenol formaldehyde type capable of being converted by heat into the insoluble, infusible resins, from tar oils and the distillates thereof; to provide in an improved manner for producing soluble, fusible resins of the phenol formaldehyde type from tar oils and the distillates thereof and for effecting a substantially complete conversion of the phenolic substances into these valuable condensation products; and to provide an improved process for the preparation of resinous condensation products in granular form adapted for ready drying from alkaline solutions of tar acids extracted directly from tar oils and distillates thereof.

In its broadest aspects the invention involves the treatment of high-or low-temperature coal tar or the distillates thereof such as are obtained in the distillation of bituminous coal and the like. Other tars however may be employed, such as those obtained by the distillation of asphaltic base petroleum oils, shale oils and the like. A distillate of any suitable boiling range may be employed, very satisfactory results having been obtained by a low temperature tar distillate having a boiling range up to 300° C. Such a distillate represents approximately 40% of the tar and contains in addition to tar acids substantial amounts of neutral oil, nitrogen bases and other impurities. A distillate of this character is treated under suitable conditions with an aqueous solution of an alkaline compound so as to transform the tar acid components of the tar into phenolates. The strength of the treating solution and the amount thereof employed are preferably controlled in such manner that the phenolate solution will not be contaminated with appreciable amounts of the neutral oil normally present in the said distillates, since if the latter is present in substantial amounts, it is difficult to produce a granular resin, and the neutral oil present in the final resinous product unfavorably affects the curing properties of the resin formed. The said phenolate solution of the tar acids is preferably heated to or near the desired reaction temperature as for example to a temperature of 70° C., and is then treated with a solution of formalin or other substance containing an aldehyde group, such as acetaldehyde, paraformaldehyde, hexamethylene tetramine, and the like, in amounts sufficient to facilitate the condensation reaction and to produce the bakelite A or B type of synthetic resin. Furfural and other aldehyde-containing closed chain organic compounds may likewise be used. The reaction which occurs is exothermic, as indicated by a sudden rise in temperature of the mixture being treated. It is essential therefore to agitate the mixture thoroughly during the condensation in order to avoid local overheating of the mixture and to insure the uniform heat treatment of all parts of the batch essential for securing a homogeneous product. Preferably the condensation reaction is carried out at or near the boiling point of the mixture; that is to say, at temperatures ranging from 100° C. to 103° C., depending upon the tar acid strength of the phenolate solution. The extent and character of the resin formation may be noted from time to time by diluting with water a small sample taken from the reaction mass and acidifying it with dilute sulphuric acid or the like to precipitate the resins. As the condensation reaction proceeds, the primary product is a resinous mass of low melting point, so that when the alkali salt is neutralized with acid the precipitated product appears and remains at room temperature as a viscous liquid or a plastic semi-solid mass. With further time of reaction the fusion point of the resin increases so that although the reaction product when precipitated by acid is in a plastic form owing to the heat of neutralization, it hardens upon cooling to room temperature to a friable spongy form. A stage is next reached at which the fusion of the condensation product during neutralization of the reaction mixture with acid occurs to a slight extent only at the moment of neutralization, the particles becoming solid immediately. This leads to a granular precipitate which is very readily filtered and washed. As the condensation reaction is allowed to proceed longer, the melting point of the resin increases and the product precipitable therefrom by acid becomes finer in particle size until the point is reached where it is extremely difficult to filter and wash. In practice, it is preferable to rapidly cool the reaction mixture when the granular stage of the resinous product has been reached. This may readily be accomplished by diluting the said mixture with a relatively large volume of water held at ordinary temperatures. Dilutions of the reaction mixture with water in the ratios of 1:4 and 1:6 have given satisfactory results. Such dilution also prevents local overheating during the subsequent acidification of the mixture.

The diluted mixture is now neutralized (or it may be treated to a point slightly beyond the point of neutrality) by means of a dilute solution of sulfuric acid, such as for example a 20% acid solution, the temperature of the mixture preferably being maintained below 30° C. during the neutralization to prevent any softening of the granular product and to avoid the precipitation thereof in a spongy form. Instead of adding the 20% solution of sulphuric acid to the reaction mixture for the purpose indicated, similar results may be obtained by adding the cold reaction mixture, after diluting it with water in the ratio of 1:4 to a dilute sulphuric acid solution—as for example a 5% or 10% solution. Still another method of precipitating the resins consists in passing carbon dioxide or flue gases containing $CO_2$ through the diluted reaction mixture. This latter method permits recausticization of the filtrate with consequent recovery of a large part of the alkali initially employed, simultaneously with the precipitation of the resins. Exact neutralization of the reaction mixture is preferable since it avoids the necessity of using acid-resistant reaction vessels.

It is sometimes desirable to allow the condensation reaction between the phenolate solution and formaldehyde to proceed to a point where the melting point of the resin precipitable from solution by acid has reached about 105° C. or above. In such instances the resin may be precipitated in granular form from the solution if the latter is heated to temperatures around 45° C. prior to the treatment with acid, or if a more highly concentrated acid or a more highly concentrated reaction solution than those previously indicated is employed. It is of course possible to use a combination of these or similar methods for the above mentioned purpose. Resins having fairly high melting points, (such as melting points of 105° C. or above) which are thus formed may be subjected to relatively high temperatures during the drying thereof without being injured or converted into the insoluble, infusible state.

The granular resin precipitated by the dilute acid is in a suitable form to filter and to wash free of any excess of reagents associated therewith. The acidified resin mixture upon standing separates into a lower layer of granular resin and an upper aqueous layer which may be removed in any suitable manner, as by decantation. Any simple method of washing and filtering the remaining granular resin may be employed. A drum type continuous filter gives very good results when used for this purpose. The filter cake containing varying amounts of water has a softening point in wet condition somewhat lower than its actual melting point, so that it tends to soften and fuse together at temperatures above 55° C. though the actual melting point of the dry powder may be about 90° C. Since it is desirable to carry out the drying operation without altering the powdery form of the resin, the operation of drying is preferably conducted under low temperature conditions preferably with the aid of either vacuum or a current of hot air, or a combination of both. It may if desired be begun at a relatively low temperature, and after the removal of the major portion of the water the drying may be safely continued at a higher temperature such as for example at 85°–100° C., provided that the melting point of the resin is not exceeded. Drying temperatures of about 55° C. give satisfactory results.

The resinous products obtained from tar distillates by this process may contain less than 2% of moisture. They are of the "bakelite A" type, completely soluble in an equal weight of 95% alcohol but they tend to partially separate from such solutions upon the addition of further alcohol. Addition of benzol greatly increases the solubility of the resins in alcohol, so that the resins are readily soluble in benzol-alcohol mixtures containing 25 to 50 per cent of benzol by volume. The resins are also readily soluble in acetone, pine oil, and chloroform—are difficultly soluble in benzol alone or in carbon tetrachloride—and are normally insoluble in the paraffin hydrocarbons such as petroleum ether and gasoline, and in drying oils such as linseed oil. Upon heating the resins at elevated temperatures they fuse and thereafter are converted to the permanently infusible and insoluble form, the rapidity of the conversion varying with the temperature. For example the time of cure for the resins obtained from the formaldehyde treatment of a phenolate solution of the tar acids of a low temperature tar distillate having a boiling range up to 300° C. is about the same as that for the commercial cresylic-formaldehyde resins prepared according to present known processes. The resins made from the tar acids of low temperature tar distillates may be completely cured by employing a relatively large proportion of formaldehyde for the condensation reaction and subsequently heating the reaction product thus obtained. However, where equimolecular amounts of the said tar acids and formaldehyde are used, the resins formed are generally partially soluble in solvents such as acetone when the maximum degree of cure has been effected. Compositions of great strength and having other desirable physical properties may be prepared from these synthetic resins by molding them with the usual type of filling materials as for example, wood flour, leather dust, asbestos, paper, china clay, gypsum, and the like. Such a composition has been prepared by mixing together equal portions of a synthetic resin made from a low temperature tar distillate in accordance with this invention and wood flour, the mixture then being molded into bar form under a pressure of 2000 pounds per square inch applied for five minutes while the mass was heated at 180° C. to convert the molded resinous material into the insoluble infusible form. The molded bar thus formed developed a transverse strength in the neighborhood of that possessed by the cresol-formaldehyde resins.

In the preparation of an aqueous solution of the alkali salts of the tar acids from a coal tar oil or a distillate thereof by treatment of the latter with a caustic alkali solution it is preferable to employ an alkali solution having a strength of approximately 15% by weight in order to secure the optimum extraction of tar acids. This caustic alkali solution may be used in equal molecular proportions with respect to the tar acid content of the distillate treated therewith, though a 5% excess of caustic alkali would give a more complete extraction of the tar acids present in the distillate. If the strength of caustic alkali solution is very greatly in excess of 15%, substantial amounts of neutral oil tend to dissolve in the phenolate solution, and such neutral oil is extremely difficult to separate therefrom later. On the other hand if the strength of caustic alkali solution is much lower than 15%, more than one treatment with the alkaline solution is essential for complete extraction of the tar acids. After mixing the tar distillate and caustic soda for a suitable period the mixture is allowed to settle and the aqueous phenolate solution forming the bottom layer is drawn off. This extraction of the tar distillate with the alkaline compound may be carried out at various temperatures according to the type of distillate employed. In the case of the distillate from low temperature tar having a boiling range up to 300° C. the extraction is preferably carried out in the cold but the mixture may be heated to about 50° C. if necessary to avoid the formation of an emulsion. Distillates having a high viscosity such as the total distillate from low temperature tar oil may be extracted at somewhat higher temperatures to effect a clear separation of the phenolate solution from the neutral oil in which the tar bases remain dissolved. Should an emulsion be formed, the same may be broken down by heating it to a slightly higher temperature. The said phenolate solution, representing a mixture of sodium salts of phenolic or other tar acid bodies extracted from the tar distillate, may be employed directly in the condensation reaction. The concentration of the salts of the tar acids present in the phenolate solution may however be widely varied without substantially affecting the final product.

The following example of the process applied to the treatment of a distillate of low temperature tar illustrates a preferred form of carrying out the invention, but is not to be regarded as a limitation of the true scope of the invention, which is defined in the appended claims. A distillate from low temperature tar and having a boiling range up to 300° C. was agitated in the cold with sufficient of a 15% sodium hydroxide solution to form a phenolate solution containing approximately 35% of a mixture of the tar acids in the form of their sodium salts the means molecular weight of the said tar acids being approximately 150. The resultant mixture was then permitted to settle, whereupon the phenolate solution formed a bottom layer which was separated from the neutral oil. 310 pounds of this phenolate solution was heated to 70° C. and was then treated with 65.4 pounds of U. S. P. formalin containing 36.5% formaldehyde. A condensation reaction occurred which was exothermic in character, so that the mixture was agitated in order to prevent local overheating of portions thereof. After the formalin had been added to the hot phenolate solution, the exothermic condensation reaction rapidly raised the temperature of the mixture to 100° C. at which temperature it was held for fifty minutes in order to form the resinous product in readily filterable form. The phenolate solution and formalin may if desired be mixed at room temperature, and the resultant mixture then heated to or near 100° C. such as for example to 98°–99° C. The progress of the condensation was observed by diluting with water a series of samples taken at intervals during the condensation from the viscous reaction mixture and acidifying the diluted samples with dilute sulphuric acid in order to precipitate the resinous product.

When the resinous product thus precipitated was deposited in granular form, the reaction was considered to have proceeded sufficiently far. At this stage the unneutralized reaction mixture has a viscosity of approximately 160–180 centipoises at 25° C. As previously indicated insufficient heat treatment will tend to produce a soft, plastic or spongy material, and overtreatment yields the product in a colloidal form difficult to wash and dry. All of these products are "bakelite A" type resins. The condensation reaction was stopped by the simple expedient of diluting the reaction mass with cold water. When the condensation had proceeded to the desired degree as indicated by the above test, the condensation mixture was cooled to approximately room temperature by dilution with water in the proportion of one part of the reaction mixture to 4 parts by volume of water. The thus diluted mixture was then treated with a 20% sulphuric acid solution in amount sufficient to neutralize the alkalinity thereof, whereupon the resins were promptly precipitated from the solution in the form of a brownish granular mass adapted for ready filtration. The latter was then filtered and washed and was thereafter dried at temperatures around 65° C. in a vacuum dryer.

In the condensation reaction if an insufficient amount of formalin is employed a spongy semisolid resin is obtained. It is therefore generally desirable to use at least equal molecular equivalents of tar acids and formaldehyde or a slight excess of the latter in order to facilitate the rapid formation of granular, resinous products of the "bakelite A" type which may be later converted into insoluble, infusible type by suitable treatment. The formation of resins capable of conversion to the infusible form is not prevented by the neutralization of the resinous reaction products by acid or even when the acid treatment is carried out to the point of giving the mixture a distinct acid reaction. It is not necessary, in order to produce the desired reaction, to heat the reaction mixture to the boiling point. Lower temperatures are suitable, and in fact the reaction can be carried out at temperatures as low as atmospheric temperature, but the speed of the reaction where other conditions remain the same varies directly with the temperature employed. For example a resinous product which can be condensed in granular form by a heat treatment for 45 minutes at 102° to 103° C., requires 1¾ hours at 93° C.–94 C., and it requires 2½ hours when condensed at 90° C. in order to be precipitable in granular form by acids. The reaction mixture may be diluted to widely different degrees with water prior to the precipitation of the resins by neutralization of the solution with dilute acids. It is important that sufficient water be present to rapidly cool the reaction mixture so as to prevent any local overheating of the same during the subsequent treatment with acid, and to facilitate the precipitation of the resin in granular form. The condensation reaction therefore occurs in a water solution in the presence of substances extractable by alkaline solutions from tar distillates, the main reaction occurring between formaldehyde and mixtures of water-soluble salts of the various tar acids present in such tar distillates. Satisfactory molded products have been made from resins formed by the present process from the total or 80% distillates from low temperature coal tar.

It is within the scope of the present invention to employ other substances than caustic alkali compounds in the preparation of the phenolate solution such as other alkaline water-soluble compounds. While the process has been specifically described in connection with the treatment of low temperature tar distillates, it may similarly be applied to the treatment of coal tar made by any of the known high temperature processes so as to yield satisfactory resins. By the term "an aldehyde" as employed in the specification and claims, I intend to designate not only the formalin solution specifically mentioned in the example given, but other compounds or mixtures thereof of the class having one or more reactive aldehyde radicals, examples of which have already been mentioned. Acetaldehyde and furfurol give very satisfactory results in the process. The strength of the formalin solution may be varied within rather wide limits, and the said solution may contain various substances such as methyl alcohol and the like which, while they do not take part in the condensation reaction, do not materially interfere wth the operation of the present process.

The practice of this invention as described herein, permits the preparation of a high grade synthetic resin of the soluble, fusible "bakelite A" type capable of being converted by heat into the insoluble, infusible type, from a heterogeneous mixture containing tar acids together with hydrocarbon mixtures and other materials which tend to be occluded by the resin when the latter is precipitated in the presence of these materials, so as to form an impure resinous condensation product of undesirable characteristics. At the same time it provides a method in which the condensation reaction is comparatively easy to control due to the fact that the said reaction occurs preferably between formaldehyde and water soluble salts of tar acids in aqueous phase rather than between the former and the tar acids per se. The velocity of the reaction between formaldehyde and these salts of tar acids is much slower than that between formaldehyde and the free tar acids or phenols. It is therefore possible to stop the said reaction at almost any desired stage of resinification so that the "bakelite A" type of resin or intermediate resinous product can be prepared safely with one stage of condensation and without the use of such relatively expensive curing agents as hexamethylene tetramine. The invention is susceptible of modification within the scope of the appended claims.

I claim:

1. The process of producing curable resinous condensation products of the phenal-formaldehyde type from a coal tar distillate which comprises the steps of reacting the said distillate with a dilute aqueous solution of a caustic alkali, thereby dissolving the tar acids contained in the said distillate to form a solution of salts of the said tar acids, separating the said solution from the residual oily liquid, and thereafter treating the said solution with a substance containing an active methylene radical.

2. The process of producing curable resinous condensation products of the phenol-formaldehyde type from coal tar distillate which comprises the steps of forming an aqueous solution of salts of the tar acid components of the said distillate, and reacting the said solution with a substance containing a reactive methylene radical thereby producing the said condensation product, cooling the resultant reaction mixture, precipitating the condensation product therefrom, and drying the latter in granular form.

3. The process of producing curable resinous condensation products of the phenol-formaldehyde type from a coal tar distillate which comprises treating the said distillate with an aqueous solution of an alkaline compound adapted to dissolve the tar acid components of the said distillate to form salts of the tar acids while preventing the formation of oil-water emulsions, thereafter separating the said solution of salts of the tar acids from the remainder of the mixture, and reacting the said solution with formaldehyde in amount at least the molecular equivalent of the tar acid components of the solution, thereby producing the curable resinous condensation product, neutralizing the resultant reaction mixture with a dilute acid substance thereby precipitating the said condensation product in granular form, and separating the latter from the reaction mixture.

4. The process as defined in claim 3 in which the aqueous solution containing the salts of the tar acids is separated from the other components of the mixture while the mixture is at temperatures in the neighborhood of 50° C.

5. In the process of producing curable resinous condensation products of the phenol-formaldehyde type from a coal tar distillate in which the said distillate is treated with an aqueous solution of a basic compound to form a solution of the salts of the tar acid components of the said distillate which is then separated from the liquid residue and is subsequently reacted upon by an aldehyde, the step of preheating the said solution containing the salts of the tar acids to near the reaction temperature prior to the addition thereto of the aldehyde whereby the condensation reaction is simplified and made more readily controllable.

6. In the process of preparing curable resinous condensation products of the phenol-formaldehyde type in which the said condensation products are formed by treatment of an alkaline phenolate solution with an aldehyde and precipitated in granular form in the presence of an excess of water, the step which comprises drying the granular condensation products at temperatures below the melting point thereof until at least the major portion of the water present therein is removed.

7. The process as defined in claim 6 in which the drying is carried out under vacuum at temperatures around 65° C.

8. The process as defined in claim 6 in which the drying is carried out in the presence of a current of hot air.

9. The process of producing curable synthetic resins of the phenol formaldehyde type from a coal tar distillate, containing tar acids and nitrogen bases, which comprises, treating the said distillate at a temperature not higher than 50° C., with a dilute aqueous solution of a basic compound, thereby forming a solution of salts of the tar acid components of the said distillate, while avoiding emulsification of the said solution with the hydrocarbon components of the distillate, separating the said solution from the said hydrocarbon components and the nitrogen bases present in the latter, heating and reacting the said solution with at least an equimolecular proportion of formaldehyde based on the tar acid components of the said solution, thereby forming the synthetic resins within the reaction mixture, cooling and diluting with water the said reaction mixture, and neutralizing the cooled and dilute mixture with an acid, thereby separating therefrom the curable resins in readily filterable, granular form.

10. The process of producing curable synthetic resins of the phenol formaldehyde type from a coal tar distillate, which comprises forming an aqueous solution of salts of the tar acid components of the said distillate, reacting the said solution in the presence of heat with an aldehyde in amount at least the molecular equivalent of the tar acid components of the solution, thereby producing a reaction mixture containing the desired synthetic resins, cooling and diluting the resultant reaction mixture with water, and thereafter neutralizing the mixture by treatment with a dilute acid substance while preventing substantial rise in temperature of the reaction mixture during neutralization, thereby precipitating the curable synthetic resins in granular form.

11. A process of producing curable resinous condensation products of the phenol-formaldehyde type from a coal tar distillate which comprises reacting a substance containing a reactive methylene group with an alkaline solution containing the alkali soluble constituents of a coal tar distillate at temperatures in the vicinity of the boiling point of the resultant reaction mixture, thereafter cooling the said reaction mixture and diluting the same with an aqueous liquid which is a non-solvent for the condensation product, neutralizing the cooled and diluted mixture thereby precipitating the condensation product in granular form with a minimum of adsorbed material, subsequently separating the said condensation product from the aqueous liquid, and washing and drying the same at temperatures below its melting point.

12. In the process of producing synthetic moldable and hardenable resins of the phenol formaldehyde type, the steps which comprise reacting together a low temperature coal tar distillate and an aqueous solution of an alkaline alkali metal compound at a temperature not higher than 50° C., thereby dissolving the tar acid components of the said distillate and forming a solution of the alkali metal salts of the tar acid components thereof, separating the said solution from the residue containing the neutral oil components of the tar distillate, and thereafter reacting upon the former with a solution of a substance containing a reactive methylene group thereby producing a reaction mixture containing the said resins, cooling the reaction mixture, neutralizing the cooled mixture with a dilute acid thereby precipitating the resins, and separating the latter from the remainder of the mixture.

13. The process as defined in claim 12 in which the said solution of the salts of the tar acids is preheated to temperatures substantially above atmospheric prior to being reacted upon by the substance containing the reactive methylene group.

14. The process of producing curable resinous condensation products of the phenol-formaldehyde type in granular form from a tar distillate which comprises the steps of treating the tar distillate to form an aqueous solution of water soluble salts of the tar acid components of the said distillate while avoiding the formation of an emulsion, separating the said aqueous solution from the residual liquid, heating the aqueous solution with at least an equimolecular amount of formaldehyde based on the tar acid content of the said solution to form a resinous condensation product soluble therein, cooling and diluting the solution, and neutralizing the cooled and diluted solution with dilute acid to precipitate the said condensation product in granular form.

15. The process as defined in claim 14 in which the said neutralization is effected at temperatures below 30° C.

16. The process as defined in claim 14 in which a distillate from low-temperature coal tar is employed as the tar-acid-bearing raw material.

17. The process as defined in claim 14 including the steps of washing the granular condensation product and of drying the latter in granular form to a water content of not more than 2%.

18. The process of producing curable resinous condensation products of the phenol-formaldehyde type in granular form which comprises, treating a tar distillate to form a mixture containing an aqueous solution of water soluble salts of the tar acid components of the said distillate at a temperature below the boiling point of the said aqueous solution while avoiding the formation of an emulsion, separating the said aqueous solution from the residual liquid, heating and reacting the aqueous solution with an aldehyde thereby producing the said resinous condensation product in solution therein, cooling the solution containing the condensation product and diluting it with a liquid which is a non-solvent for the latter, thereby precipitating the said product in granular form, and separating and drying the same while maintaining it in granular form.

19. The process of producing curable synthetic resins of the phenol formaldehyde type from a coal tar distillate, which comprises the steps of treating the said distillate with a dillute aqueous solution of a caustic alkali at a temperature below the boiling point of the mixture thereby dissolving the tar acids contained in the said distillate and forming a solution of the salts of the said tar acids, separating the said solution from the residual oily liquid, and thereafter reacting the said solution with formaldehyde, the latter being in amount at least the molecular equivalent of the tar acids present in the solution.

20. The process of producing curable synthetic resins of the phenol formaldehyde type from a coal tar distillate which comprises, treating the said distillate at a temperature not higher than 50° C., with an aqueous solution of an alkaline compound adapted to dissolve the tar acid components of the said distillate thereby forming salts of the tar acids, thereafter separating the said solution of the salts of the tar acids from the remainder of the mixture, and reacting the said solution with formaldehyde in an amount at least the molecular equivalent of the tar acid component of the solution, thereby producing the said curable synthetic resins.

21. In the process of preparing curable synthetic resins of the phenol formaldehyde type in which the said resins are formed by treatment of an alkaline phenolate solution with an aldehyde and are precipitated in granular form, the steps which comprise washing the precipitated resins with a liquid in which they are substantially insoluble, and thereafter drying them at a temperature not higher than 65° C., until at least the major portion of the said liquid present therein is removed.

22. The process of producing curable synthetic resins of the phenol formaldehyde type from a low temperature coal tar distillate containing tar acids and nitrogen bases, which comprises treating the said distillate at a temperature not higher than 50° C., with a dilute aqueous solution of a caustic alkali compound thereby forming a solution of alkali metal salts of the tar acid components of the said distillate, separating the solution from the hydrocarbons and nitrogen bases of the tar distillate, heating the solution with formaldehyde, the latter being in amount at least the molecular equivalent of the tar acid components of the said solution, thereafter cooling the resultant reaction mixture, and neutralizing the cooled mixture with a gas containing $CO_2$ thereby separating therefrom the desired synthetic resins in a readily-filterable, granular form.

23. The process of producing curable synthetic resins of the phenol formaldehyde type from a low temperature coal tar distillate having a boiling range up to 300° C., which comprises forming an aqueous solution of salts of the tar acid components of the said distillate, heating and reacting the said solution with formaldehyde in amount at least the molecular equivalent of the tar acid components of the said solution, continuing the said reaction until the synthetic resin thus formed has a melting point of at least 105° C., thereafter cooling and diluting with water the resultant reaction mixture containing the resin, neutralizing the said mixture with a dilute acid thereby precipitating the resin in granular form, separating the precipitated resin from the remaining reaction mixture, washing the resin, and drying the same at a temperature below its melting point.

MADHAV R. BHAGWAT.